United States Patent
Schmidt et al.

(10) Patent No.: US 7,424,401 B2
(45) Date of Patent: Sep. 9, 2008

(54) METHOD AND DEVICE FOR DATA PROCESSING USING AGENTS BETWEEN EVALUATING MEANS AND DISTRIBUTING MEANS

(75) Inventors: Regina Schmidt, Hamburg (DE); Hauke Peters, Osterronfeld (DE)

(73) Assignee: Evotec Oai AG, Hamburg (DE)

( * ) Notice: Subject to any disclaimer, the term of this patent is extended or adjusted under 35 U.S.C. 154(b) by 0 days.

(21) Appl. No.: 10/495,792

(22) PCT Filed: Nov. 8, 2002

(86) PCT No.: PCT/EP02/12488

§ 371 (c)(1),
(2), (4) Date: May 17, 2004

(87) PCT Pub. No.: WO03/042820

PCT Pub. Date: May 22, 2003

(65) Prior Publication Data

US 2005/0043927 A1 Feb. 24, 2005

(30) Foreign Application Priority Data

Nov. 15, 2001 (DE) .................................. 101 56 036

(51) Int. Cl.
*G06F 13/00* (2006.01)
*G06F 15/00* (2006.01)
(52) U.S. Cl. .................... 702/189; 702/186; 702/188
(58) Field of Classification Search ................ 702/189, 702/122, 182, 183, 186–188; 719/317
See application file for complete search history.

(56) References Cited

U.S. PATENT DOCUMENTS

| 5,606,493 | A |   | 2/1997  | Duscher et al. ............... 700/5   |
|-----------|---|---|---------|----------------------------------------|
| 5,875,178 | A | * | 2/1999  | Rahuel et al. ............... 370/313  |
| 5,933,647 | A | * | 8/1999  | Aronberg et al. ............ 717/178   |
| 6,138,119 | A | * | 10/2000 | Hall et al. ....................... 707/9 |
| 6,549,932 | B1| * | 4/2003  | McNally et al. ............. 709/202   |

(Continued)

FOREIGN PATENT DOCUMENTS

DE  19718410 A1  11/1998

(Continued)

OTHER PUBLICATIONS

Translation of DE 197 18 410 A1.*

(Continued)

*Primary Examiner*—Hal D Wachsman
(74) *Attorney, Agent, or Firm*—Griffin & Szipl, P.C.

(57) ABSTRACT

A data processing method with which especially image data, generated by an image recording means such as a CCD camera, may be processed, comprises a data distributing means. The data are transmitted from the recording means to a manager of the data distributing means. The manager selects a suitable agent related to an evaluating means. Whether an agent is suitable depends on suitability parameters of the evaluating means. For example, suitability parameters are the availability and the type of software stored on the evaluating means. After selection of a suitable agent the data are transmitted between an agent and the corresponding evaluating means via an interposed agent and another manager (24). The data transmission is always done in standardized data containers.

24 Claims, 2 Drawing Sheets

U.S. PATENT DOCUMENTS

| | | | |
|---|---|---|---|
| 6,574,655 B1* | 6/2003 | Libert et al. | 709/200 |
| 6,615,405 B1* | 9/2003 | Goldman et al. | 717/174 |
| 6,636,912 B2* | 10/2003 | Ajanovic et al. | 710/105 |
| 7,047,241 B1* | 5/2006 | Erickson | 707/9 |
| 7,191,392 B1* | 3/2007 | Coar | 715/512 |
| 2002/0138549 A1* | 9/2002 | Urien | 709/202 |
| 2003/0061340 A1* | 3/2003 | Sun et al. | 709/224 |
| 2003/0135670 A1* | 7/2003 | Anderson | 710/22 |
| 2003/0140089 A1* | 7/2003 | Hines et al. | 709/202 |
| 2005/0055350 A1* | 3/2005 | Werme et al. | 707/10 |
| 2005/0251569 A1* | 11/2005 | Nishio | 709/223 |

FOREIGN PATENT DOCUMENTS

| | | |
|---|---|---|
| DE | 19916604 A1 | 10/2000 |
| WO | WO 93/18464 | 9/1993 |
| WO | WO 00/65441 | 11/2000 |

OTHER PUBLICATIONS

Translation of DE 199 16 604 A1.*

Chella et al., "Daisy: a distributed architecture for intelligent system", Oct. 20-22, 1997, IEEE, Proceedings Fourth IEEE International Workshop on Computer Architecture for Machine Perception, 1997, pp. 42-50.*

Livermore et al., "Architecture and Control of an Adaptive High-Capacity Flat Network", May 1998, IEEE Communications Magazine, pp. 106-112.*

J.T. Inman, et al, "A high-throughput distributed DNA sequence analysis and database system", IBM Systems Journal, vol. 40, No. 2, 2001, no date.

Arita et al, "RPV: A Programming Environment for Real-time Parallel Vision—Specification and programming methodology", Department of Intelligent Systems, Kyushu University, 6-1 Kasuga-Koen, Kasuga, Fukuoka 816-8580 Japan, 12 pps, no date.

Albanese, Stephen, "DSP-based Vision Comes of Age", Matrox Imaging, News Room, Technology Article Archives, Jul. 26, 2002, 6 pps.

* cited by examiner

METHOD AND DEVICE FOR DATA PROCESSING USING AGENTS BETWEEN EVALUATING MEANS AND DISTRIBUTING MEANS

This is a National Phase Application in the United States of International Patent Application No. PCT/EP02/12488 filed Nov. 8, 2002, which claims priority on German Patent Application No. 101 56 036.2, filed Nov. 15, 2001. The entire disclosures of the above patent applications are hereby incorporated by reference.

BACKGROUND OF THE INVENTION

The invention refers to a method and a device for data processing, in particular for image data processing, where, e.g., a large amount of image data has to be handled in short time. Such an image data processing means is necessary, for example, in screening processes on, e.g., biological and/or chemical samples, in particular in high throughput screening and media screening. High-resolution images, in particular digitally recorded high-resolution images, comprise a large amount of image data. In confocal microscopy, for example, even images of a medium resolution typically have a size between 5 to 10 Mbyte. In modern high throughput screening installations a plurality of chemical and/or biological samples are examined in short time. Here, at least one image is generated of every sample. Usually, titer plates are used in high throughput screening that have 1536 recesses (wells), for example, where a sample is located in each well. In modern high throughput screening installations, up to 50 titer plates and more are scanned a day. The daily amount of data thus sums up to about 400 to 1,000 Gbyte. Besides recording image data, other examining methods such as fluorescence spectroscopy acquire a plurality of measuring or analysis data. In addition to the problem of a great storage effort for such data, there is a problem, in particular with high throughput screening, that the assaying methods are extremely complex and therefore require high computing power. In the above described example, performing conventional assaying methods on the data recorded on one day would take about 1 week even with a fast computer. In high throughput screening installations charged to capacity and continuously operating, evaluation times that long would result in a substantial hardware effort to be able to process a corresponding amount of data. Further, the delay between performing the assay and obtaining the evaluation results is too long, especially for modern service companies.

BRIEF SUMMARY OF THE INVENTION

It is the object of the present invention to provide a method of data processing with which a large amount of data, especially image data, can be processed and evaluated, respectively, in short time with high operational reliability. Further, it is an object of the invention to provide a device for performing the method.

According to the invention, the object is solved with the features of the claims.

With the present method, data, especially image data, are generated by means of a recording means, such as a CCD camera, for example. In a first step, the data are transmitted to a data distributing means, e.g., a computer. An essential aspect of the invention is that the data transmitted to the data distributing means with short time-lags, are processed or evaluated in parallel on a plurality of data evaluating means. Here, the usual time-lag between two successive sets of data is 0,6-1,2 s, for example. The parallelized evaluation of the data allows for a much faster evaluation. With a corresponding high-level parallelization, it is possible to evaluate the images or data or sets of data, respectively, generated by a high-throughput screening installations, quasi simultaneously. In the present method, it is further possible to associate a high-throughput screening unit to an evaluating unit with a plurality of data evaluating means operating in parallel, each having a rather low computing capacity. Thus, the costs of data evaluation are reduced substantially.

For an efficient exploitation of the data evaluating means, the data, which may be image data, for example, are prepared in the data distributing means in an appropriate manner and are transmitted well directed. According to the invention, in the data distributing means, the data to be evaluated are first associated to a suitable data evaluating means. Here, preferably, known suitability parameters of the individual data evaluating means that may differ from each other are compared to the requirements for the evaluation of the data so that an optimum association of the data to be evaluated to a data evaluating means can be effected. For example, the suitability parameters are the processing capacity and/or the processing speed and/or the kind of software present in the data evaluating means and/or the availability of the data evaluating means. The most important suitability parameter is the evaluation soft-ware, possibly including the version number. For example, a plurality of data evaluating means may be provided with different software in different versions with which different evaluation methods, such as FCS, FIMDA, FILDA etc., or evaluation methods for evaluating image data such as Huff transformations can be performed. Another important suitability parameter is availability. Here, it is checked whether the corresponding data evaluating means performs a calculation at a certain moment or whether the data evaluating means is available. This association of the data to be evaluated to a suitable data evaluating means further improves the data processing process and, for example, further reduces the time between the data acquisition and the presentation of the evaluation result.

Another essential aspect of the present method is that the data for the transmission from the data distributing means to the data evaluating means are transferred into a standardized data container. Here, the containers are identical, regardless of the data actually contained. This is advantageous in that standardized protocols can be used to transmit the data containers. Thus, the operational reliability of the installation is improved. Further, a fast transmission may thus be achieved.

Then, according to the present invention, the standardized data container is transmitted to the suitable data evaluating means.

Preferably, a respective evaluation order is associated to the data in the data recording means. The evaluation order may relate, for example, to the type of analysis method that is to be performed by the data evaluating means. Corresponding evaluation orders may transmitted, e.g., by an external computer to the recording means depending on the current recording process, especially a screening process. Preferably, the evaluation order is transferred together with the data in the data container so that again a standardized data container is transmitted that includes the data and the evaluation order. Connecting an evaluation order with the data immediately in the data recording means and/or the data distributing means has the advantage that the evaluation orders do not have to be transmitted directly to the individual data evaluating means. Thus, for example, no additional connections are required that lead from an external computer to the individual data evaluating means. Further, it is made sure that only standardized data containers will be transmitted between the data evaluating means and the data distributing means so that a high standard can be maintained with a view to operational reliability.

The data generated by the recording means can be latched in a data bank prior to evaluation. For example, this is also advantageous for a later performance of different evaluation methods on the same data.

A particularly preferred embodiment of the invention provides an agent. The agent serves to manage the individual data evaluating means. In a file of the agent, specific to a data evaluating means, the suitability parameters of the data evaluating means are stored. In particular, each data evaluating means has an agent of its own associated thereto, which preferably is a part of the data distributing means. Due to the provision of an agent, it is possible for the data distributing means to communicate only with the corresponding agents of the individual data evaluating means and not with the data evaluating means themselves. Communication with the data evaluating means is effected exclusively via the agents. Preferably, the agents, especially in a starting period, sample the suitability parameters of the individual data evaluating means. Thus, for example at the start of a high-throughput screening process, the suitability parameters of the individual data evaluating means are already known. The data distributing means may thus rapidly access these data. This has the advantage that the suitable data evaluating means can be selected by the data distributing means in short time. Preferably, the agents sample the suitability parameters in regular intervals or they are transmitted in regular intervals to the agents by the data evaluating means.

In a particularly preferred embodiment of the invention, respective agents are provided both on the side of the data distributing means and on the side of the individual data evaluating means. When the data evaluating means are individual computers, for example, each of these computers has an agent. There is a corresponding agent on the side of the data distributing means. Thus, in this embodiment, there always exist pairs of two agents that communicate with each other and are associated with a data evaluating means, respectively. Thus, the exchange of data between the data distributing means and the data evaluating means is substantially facilitated. In particular, it is possible for different pairs of agents to communicate via different network protocols. It is only necessary for one pair of agents to communicate via the same network protocol. This has the advantage that the entire installation can be complemented in a simple manner by further data evaluating means and can also be expanded in other ways. This increases flexibility.

Since the data evaluating means preferably are separate computers, the data transfer between the data distributing means and the data evaluating means is effected using data telecommunication means such as cables and the like.

Preferably, after an evaluation order has been carried out, a data evaluating means reports back to the associated agents and/or the data distributing means. The agents and/or the data distributing means thus always know the state of the individual data evaluating means. As described above, the availability of the individual data evaluating means is a suitability parameter.

When the report is not issued within a predetermined time, possibly depending on the type of the evaluation order, the evaluation order is cancelled with respect to this data evaluating means and is preferably transferred to another suitable data evaluating means. This ensures that errors occurring in a data evaluating means will cause individual sets of data or images not to be evaluated. In another preferred embodiment, a test routine is performed on the corresponding data evaluating means after cancellation of an evaluation order. The test routine may be a software check, for example. Should this not lead to a repair of the data evaluating means, the same may be turned off and an alarm signal may be issued to the operator. In this manner, the operational reliability of the entire evaluating system is increased. Further, after a single or multiple occurrences of an error, the connection to the corresponding data evaluating means may be interrupted.

Preferably, after processing by the individual data evaluating means, the evaluation results of the individual evaluation orders are transmitted directly to a means for further processing. This may be a data bank, for example. The evaluation results may also be transmitted back to the data distributing means. In this re-transmission, the above described preferred structure of agents and data containers may be used as well. The transmission to a means for further processing may also be effected from the data distributing means.

It is further possible to connect a plurality of data distributing means with the data evaluating means. Thus, a plurality of recording means, each individually connected to a data distributing means, for example, may be served by a plurality of data distributing means. This reduces the costs per evaluation order and increases evaluation speed.

In a particularly preferred embodiment, the data distributing means and/or each computer including an evaluating means comprises a manager. The manager organizes the individual agents. For example, the manager may be used to connect single data received from the recording means with an evaluation order.

The present method for data processing is suited in particular for processing data that are acquired during a screening of chemical and/or biological samples. In such screening methods, as in high-throughput screening or medium screening, a large amount of data is generated. For example, in high-throughput screening, individual wells, i.e. recesses in a titer plate, are screened sequentially. Thereafter, the image data generated in the process have to be processed further. Further, it is possible to simultaneously sample a plurality of different wells in one image. The individually sampled wells may also be separated using the present data processing method.

To evaluate the data, especially the image data, mask systems can be used, for example. These may be, e.g., a comparison of the captured image with standardized images.

Further, the invention refers to a device such as a data processing installation for performing the present method. The data processing installation comprises a recording means for generating data, especially image data. Further, the data processing installation comprises a data distributing means for transmitting the data to a suitable data evaluating means. The data evaluating means and the data distributing means may each be separate computers.

Moreover, the invention refers to a data storage medium, such as a CD-ROM, containing a computer program for performing the present method.

BRIEF DESCRIPTION OF THE SEVERAL VIEWS OF THE DRAWINGS

The following is a detailed description of preferred embodiments of the invention with reference to the accompanying drawings.

In the Figures.

DETAILED DESCRIPTION OF THE INVENTION

An image recording means 10, such as a CCD camera connected to a microscope, generates images of a biological and/or chemical sample and connects these with an evaluation order. The evaluation order comprises, for example, the method with which an image or other data are to be evaluated. The data, which may be image data, are transmitted to a data distributing means 12 which may be a conventional computer. The data distributing means 12 comprises a manager 14 and a plurality of agents 16. The manager 14 of the data distributing means 12 receives the image data and evaluation orders generated by the image recording means 10. Instead of connecting the evaluation orders with the image data by the manager 14, this connection may already be done in the recording means 10.

Besides managing the agents 16, it is another task of the manager 14 to pack data, such as image data, received from the image recording means 10 into data container. The data container is standardized software or the like so that the data transmission is always effected in the same identical data container. Regardless of the contents of the data containers, the requirement for transmitting the data is identical. The individual containers only differ in that the evaluation order, which is measurement-specific to the data in the container, is tagged to the container in the form of a route card. One container may also hold several evaluation orders.

Figure 1:
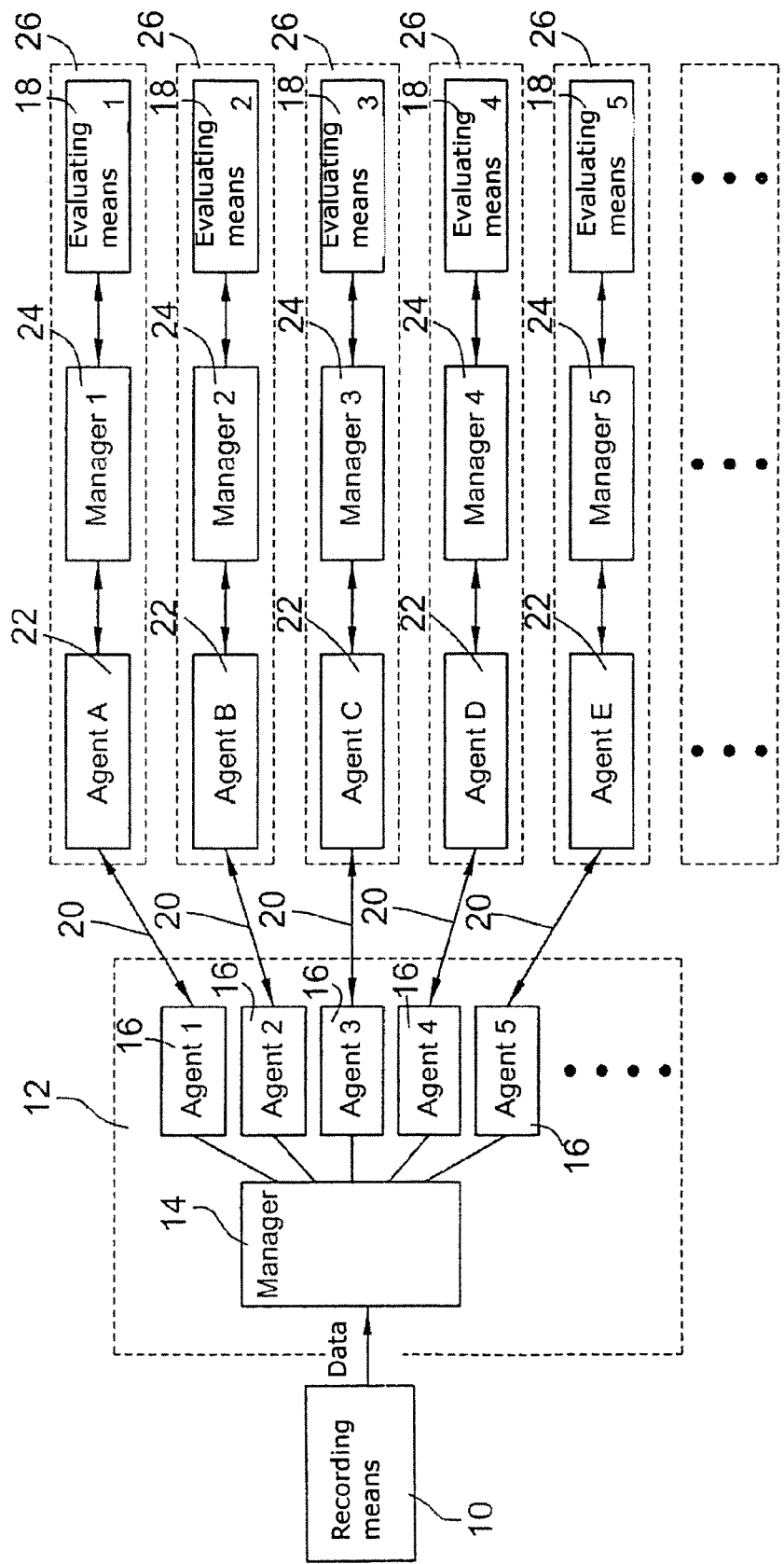
FIG. 1 is a schematic flow diagram of a preferred embodiment of the method of the invention.

The data distributing means has several agents 16, called agent 1, agent 2, and so on, in FIG. 1. Each agent 16 is associated to one evaluating means 18. During a starting period, each agent 16 samples the suitability parameters of the associated evaluating means 18 via a data transmission line 20, as well as an agent 22 and a manager 24. Each agent 16, i.e., agents 1, 2, 3, etc., is thus associated to an agent 22, i.e., agents A, B, C, etc., as well as a manager 24, i.e., the managers 1, 2, 3, etc., related to the associated evaluating means 18, i.e., the evaluating means 1, 2, 3, etc. The suitability parameters sampled such as the availability of the evaluating means, the evaluation software present on the evaluating means, etc., are stored by the agent 16.

Image data, which have been associated to an evaluation order by the image recording means 10, must now be transmitted by the manager 14 to one of the evaluating means 18. To this avail, the manager 14 first communicates with the agents 16 associated to the data distributing means 12. Here, the suitable agent 16 or the evaluating means represented by the corresponding agent is selected, respectively, using different distribution algorithms. Since the selection of the suitable evaluating means 18 is effected within the data distributing means 12 by sampling the agents 16, a quick selection of the suitable evaluating means is possible, requiring no data sampling via other connections and the like. To select the suitable evaluating means 18, the manager 14 can sample the agents 16 sequentially, for example, and determine, whether the suitability parameters necessary for the respective evaluation order are given. It is further possible to assign priorities to individual agents 16 so that the sampling is effected according to priority. A random selection of the sampling sequence for the agents 16 is also possible.

In order to communicate between the data distributing means 12 and the individual evaluating means 18, e.g. via different network protocols, a respective agent 22 is associated to the individual evaluating means 18. The agents 22, i.e. the agents A, B, C, etc., each know the suitability parameters and especially the current state of the associated evaluating means 18, i.e., the evaluating means 1, 2, 3, etc. Communication between the data distributing means 12 and the individual evaluating means 18 is thus effected exclusively between the two agents 16, 22 via the data lines 20.

In addition, the image data to be transmitted by an agent 16 to the associated evaluating means 18 are transferred into a standardized data container together with the evaluation order for transmission. The data containers are generated by the manager 14. The standardization of the data containers is such that the individual agents 16 and 22 discern no difference between the data containers. Regardless of the image date contained in the data container, as well as of the evaluation orders connected with these image data, each data container 16, 22 is always identical to the agents 16, 22. Thus, the data transmission via the data telecommunication lines 20 can also be standardized, since always an identical data container is transmitted.

The transmission of the suitability parameters by the agents 22 to the agents 16 preferably also takes the form of standardized data packages. Thus, exclusively, standardized data packages are transmitted via the data telecommunication means 20.

For evaluation of the image data in an evaluating means 18, each evaluating means 18 is associated to a manager 24. The manager 24 serves to "unpack" the data containers. Thus, the manager 24 cancels the standardized data container and prepares it for the evaluating means 18 such that an evaluation of the corresponding image data can take place according to the order. Thus, it is the task of the manager 24 to pass the unpacked data and the evaluation order to the evaluating means 18. When the evaluation order has been carried out by the evaluating means 18, it is another task of the manager 24 to "pack" the processed data into the data container again. Thereafter, the manager 24 passes the data containers that contain the processed data, via the associated agent 22 to the agent 16. Possibly, the agent 16 passes the data to the recording means 10 via the manager 14, where the data are stored. It is also possible to pass the data to another data bank.

The image data evaluated by. the evaluating means 18, i.e. the evaluation results, may either be transmitted to a data bank (not illustrated) or re-transmitted to the manager 14 via the present data lines 20. Upon re-transmission to the manager 14, data containers are again generated by the manager 24 so that the transmission between the agents 22, 16 is standardized again.

One agent 22, one manager 24 and one evaluating means 18, respectively, are configured as computers 26. The processing of the images captured by the image recording means 10 is performed in a parallelized manner by several computers 26.

Figure 2:
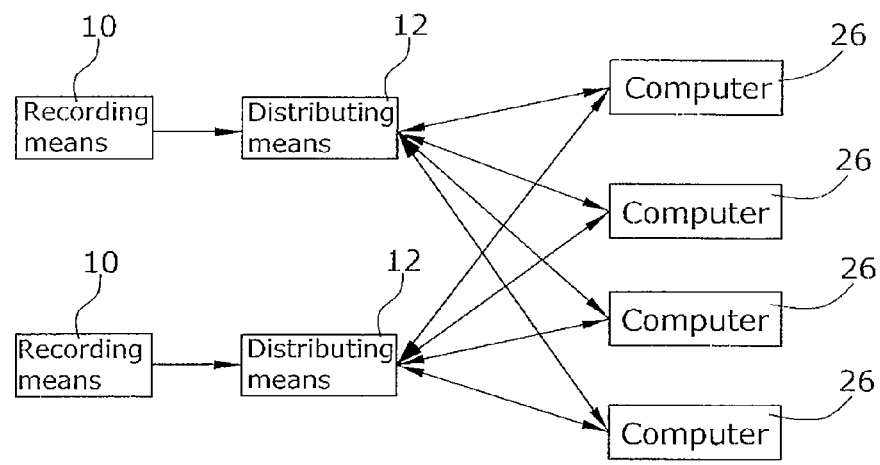
FIG. 2 is a schematic flow diagram of an embodiment of the invention wherein each computer is used by two image recording means.

In the embodiment illustrated in FIG. 2, the computers 26 are used by two image recording means 10. Each image recording means 10 is associated to one data distributing means 12, respectively, which then accesses the different computers 26 with the assistance of the corresponding agents.

Figure 3:
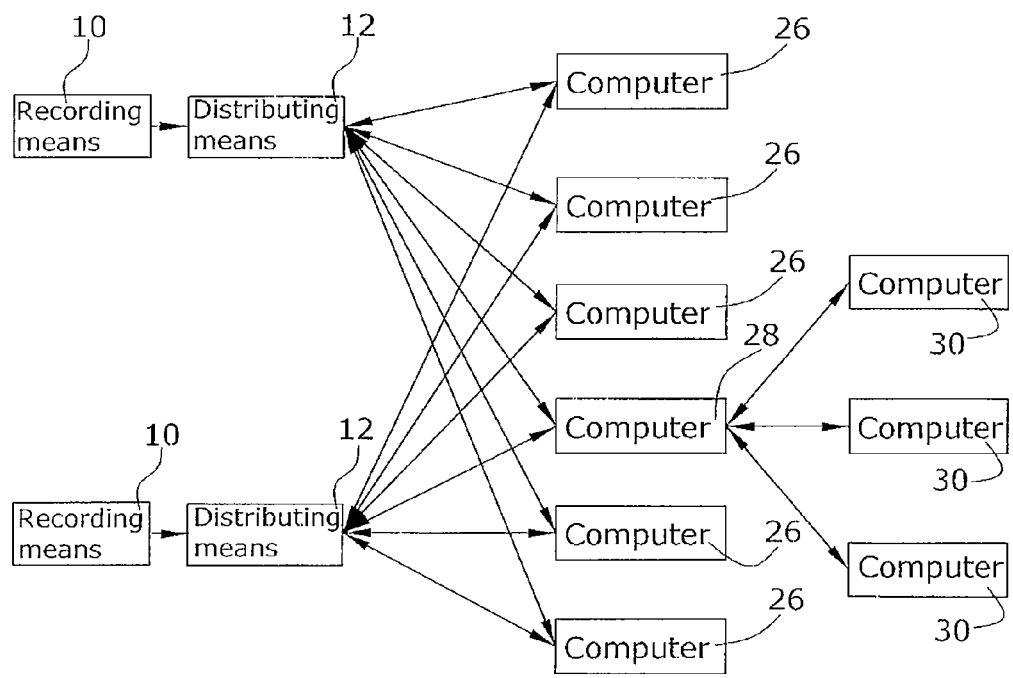
FIG. 3 is a schematic flow diagram of a two stage data processing embodiment of the invention.

The embodiment illustrated in FIG. 3 refers to a two-stage data processing. Here, a computer 28 is provided on the level of the computers 26 including the evaluating means, which assumes the tasks of the data distributing means 12. To the data distributing means 12, the computer 28 quasi is an evaluating means with high availability. To the data distributing means 12, there is no difference between the individual computers 26 and the computer 28. It is of no importance to the data distributing means 12, whether the computer 28 is a high-performance computer, for example, which evaluates the image data itself, or whether the computer 28 passes the individual orders to further computers 30.

Of course, this structure may be expanded by further stages.

The invention claimed is:

1. A method for data processing comprising the following steps:
   generating data by means of a recording means;
   transmitting the data to a data distributing means for distribution of the data to a plurality of suitable data evaluating means, wherein, in the data distributing means,
   the data to be evaluated are associated to a suitable data evaluating means, and
   the data are transferred into a standardized data container for transmission, and
   transmitting the standardized data container to the suitable data evaluating means, wherein
   each suitable data evaluating means is associated with an agent on the side of the data distributing means and another agent on the side of the suitable data evaluating means, and wherein data exchanged between each suitable data evaluating means and the data distributing means are exchanged exclusively between the two agents,
   wherein suitability parameters of the suitable data evaluating means are sampled for association of the data to a suitable evaluating means, and
   wherein the suitability parameters are stored in a file of the agent on the side of the data distributing means, the file being specific to a suitable data evaluating means.

2. The method of claim 1, wherein, in the recording means or in the data distributing means, the data are associated to an evaluation order, and the data are transmitted to the suitable data evaluating means together with the evaluation order in the standardized data container.

3. The method of claim 1, wherein the agent on the side of the data distributing means is part of the data distributing means.

4. The method of claim 1, wherein the suitability parameters of the suitable data evaluating means are sampled via the agent on the side of the data distributing means.

5. The method of claim 4, wherein said sampling occurs during a starting-period.

6. The method of claim 1, wherein each standardized data container is transmitted between the data distributing means and the suitable data evaluating means via a data telecommunication means.

7. The method of claim 1, wherein each evaluating means comprises software, and the type of the software available and/or the version of the software and/or the availability of the software are transmitted as the suitability parameters of the data evaluating means.

8. The method of claim 1, wherein each data evaluating means is associated with a suitability parameter and the suitable data evaluating means is selected by sequentially sampling the respective suitability parameters.

9. The method of claim 1, wherein each data evaluating means is associated with a suitability parameter and the suitable data evaluating means is selected by sampling the respective suitability parameters according to a predetermined priority order.

10. The method of claim 9, further comprising a step of executing an evaluation order, wherein the agents or the data distributing means cancel the evaluation order after lapse of a predetermined period during which no report has been issued from the suitable data evaluating means, and transfers the evaluation order to another suitable data evaluating means.

11. The method of claim 10, wherein after the cancellation a test routine is performed in the suitable data evaluating means.

12. The method of claim 1, further comprising a step of executing an evaluation order, wherein, after execution of the evaluation order, the suitable data evaluating means reports back to the data distributing means, or to the agents, or to the data distributing means and to the agents.

13. The method of claim 1, wherein an evaluation result of an evaluation order is transmitted to a post-processing means.

14. The method of claim 13, wherein said post-processing means comprises a data bank, or the data distributing means, or the data bank and the data distributing means.

15. The method of claim 1, wherein a plurality of recording means, or a plurality of data distributing means, or a plurality of recording means and a plurality of data distributing means, are connected with a plurality of data evaluating means.

16. The method of claim 1, wherein the data distributing means comprises a manager for organizing the agents.

17. The method of claim 16, wherein the manager connects the data obtained from the recording means with a data container.

18. The method of claim 1, wherein a manager is associated to each suitable data evaluating means, the manager removing the data contained in the standardized data container and passing the data to the suitable data evaluating means together with an evaluation order.

19. The method of claim 18, wherein the manager of the suitable data evaluating means connects the data processed by the suitable data evaluating means to a data container and passes the processed data to a manager of the data distributing means.

20. The method of claim 1, wherein the data is acquired by screening.

21. A data processing installation, comprising
   (a) a recording means for generating data; and
   (b) a data distributing means for transmitting the data to a plurality of suitable data evaluating means, wherein
   the data distributing means is disposed to associate the data to be evaluated to the suitable data evaluating means, to transfer the data into a standardized data container for transmission, and to use the standardized data container for transmitting the data to the suitable data evaluating means; and
   each suitable data evaluating means is associated with an agent on the side of the data distributing means and another agent on the side of the suitable data evaluating means, and wherein data exchanged between each suitable data evaluating means and the data distributing means are exchanged exclusively between the two agents, wherein the data processing installation performs a method for data processing comprising the following steps:
   generating data by means of the recording means; and
   transmitting the data to the data distributing means for distribution of the data to the plurality of suitable data evaluating means, wherein, in the data distributing means,
   the data to be evaluated are associated to a suitable data evaluating means, and
   the data are transferred into the standardized data container for transmission, and
   transmitting the standardized data container to the suitable data evaluating means, wherein suitability parameters of the suitable data evaluating means are sampled via the agent on the side of the data distributing means, and wherein suitability parameters of the suitable data evaluating means are sampled for association of the data to a suitable evaluating means, and the suitability parameters are stored in a file of the agent on the side of the data distributing means, the file being specific to a suitable data evaluating means.

22. Data storage medium comprising computer software stored on a computer readable medium, the software comprising instructions causing a processor to execute the steps of:
    transmitting data from a recording means to a data distributing means, and then to a plurality of suitable data evaluating means,
    wherein, in the data distributing means, the data to be evaluated are associated to the suitable data evaluating means, and the data are transferred into a standardized data container for transmission, and the data distributing means uses the standardized data container for transmitting the data to the suitable data evaluating means; and
    wherein each suitable data evaluating means is associated with an agent on the side of the data distributing means and another agent on the side of the suitable data evaluating means, and wherein data exchanged between each suitable data evaluating means and the data distributing means are exchanged exclusively between the two agents, and
    wherein suitability parameters of the suitable data evaluating means are sampled via the agent on the side of the data distributing means, wherein suitability parameters of the suitable data evaluating means are sampled for association of the data to a suitable evaluating means, and wherein the suitability parameters are stored in a file of the agent on the side of the data distributing means, the file being specific to a suitable data evaluating means.

23. A method for data processing comprising the following steps:
    generating data by means of a recording means; and
    transmitting the data to a data distributing means for distribution of the data to a plurality of suitable data evaluating means, wherein, in the data distributing means,
    the data to be evaluated are associated to a suitable data evaluating means, and
    the data are transferred into a standardized data container for transmission, and
    transmitting the standardized data container to the suitable data evaluating means, wherein
    each suitable data evaluating means is associated with an agent on the side of the data distributing means and another agent on the side of the suitable data evaluating means, and wherein data exchanged between each suitable data evaluating means and the data distributing means are exchanged exclusively between the two agents, and
    wherein suitability parameters of the suitable data evaluating means are sampled via the agent on the side of the data distributing means, and
    wherein the suitability parameters are stored in a file of the agent on the side of the data distributing means, the file being specific to a suitable data evaluating means.

24. A data processing installation, comprising
    (a) a recording means for generating data; and
    (b) a data distributing means for transmitting the data to a plurality of suitable data evaluating means, wherein
    wherein the data distributing means is disposed to associate the data to be evaluated to the suitable data evaluating means, to transfer the data into a standardized data container for transmission, and to use the standardized data container for transmitting the data to the suitable data evaluating means; and
    each suitable data evaluating means is associated with an agent on the side of the data distributing means and another agent on the side of the suitable data evaluating means, and wherein data are exchanged between each suitable data evaluating means and the data distributing means are exchanged exclusively between the two agents, and
    wherein suitability parameters of the suitable data evaluating means are sampled via the agent on the side of the data distributing means, and wherein the suitability parameters are stored in a file of the agent on the side of the data distributing means, the file being specific to a suitable data evaluating means.

* * * * *